United States Patent Office 2,792,434
Patented May 14, 1957

2,792,434

PROCESS FOR THE PRODUCTION OF HEXACHLORBENZENE

Friedrich Becke, Bad Duerkheim, and Heinrich Sperber, Ludwigshafen (Rhine), Germany, assignors to Badische Anilin- & Soda-Fabrik Aktiengesellschaft, Ludwigshafen (Rhine), Germany No Drawing. Application November 22, 1954, Serial No. 470,508

Claims priority, application Germany November 26, 1953

13 Claims. (Cl. 260—650)

This invention relates to a new and improved process for the production of hexachlorbenzene.

It is already known that hexachlorcyclohexanes and more highly chlorinated cyclohexanes can be converted into hexachlorbenzene. Thus, for example, hexachlorcyclohexanes can be converted catalytically or thermally into trichlorbenzene; hexachlorbenzene can be obtained from the reaction product by nuclear chlorination. These processes are however troublesome and uneconomical. It has also already been proposed to react hexachlorcyclohexanes directly to hexachlorbenzene by treatment with chlorine at elevated temperature.

We have now found that hexachlorbenzene is obtained in a simple manner in almost theoretical yields by treating hexachlorcyclohexanes or higher chlorinated cyclohexanes, in particular the stereo-isomers of gamma-hexachlorcyclohexane, with chlorides and/or the anhydride of sulfuric acid, advantageously in the presence of catalysts. Suitable catalysts are for example the halides of metals, as for example of iron and aluminum, and of non-metals, as for example phosphorus and sulfur. The halides can also be first formed during the reaction.

The treatment of the initial materials with the chlorides of sulfuric acid or the anhydride of sulfuric acid takes place at elevated temperatures, as for example at 100° C. or more, advantageously at about 130° to 200° C. In general normal pressures are used, but higher pressures, as for example about 20 to 250 atmospheres, are also suitable.

The process is preferably carried out for example by heating the highly chlorinated cyclohexanes with the chlorides of sulfuric acid, such as sulfuryl chloride or chlorsulfonic acid, or the anhydride of sulfuric acid for some time, as for example several hours advantageously in the presence of a catalyst. The anhydride may be used as such or dissolved in sulfuric acid, for example in the form of oleum. The amount of the chlorides or the anhydride of sulfuric acid can be different in the case of each individual chlorinated cyclohexane. In general about 120 to 400 parts, advantageously about 170 parts, by weight are used for each 100 parts by weight of the initial material. Inert solvents, such as carbon tetrachloride, chloroform or other halogen hydrocarbons, can be co-employed, but it is then usually necessary to work in closed vessels.

The hexachlorbenzene obtained may be readily separated from the reaction mixture after cooling, for example by filtration, and purified from adherent products by washing with solvents, such as water.

The following examples will further illustrate this invention but the invention is not limited to these examples. The parts are parts by weight.

Example 1

100 parts of the crude residual isomer mixture such as is obtained in the production of gamma-hexachlorcyclohexane are heated to boiling with 200 parts of chlorsulfonic acid for 48 hours with reflux cooling. After cooling, the product is filtered off and the filter residue is washed with water. 75 parts of hexachlorbenzene of the melting point 223° to 228° C. are obtained.

Example 2

100 parts of pure alpha-hexachlorcyclohexane are heated to boiling under reflux with 200 parts of chlorsulfonic acid for 48 hours. After cooling, the precipitate is filtered off and washed with water. 78 parts of hexachlorbenzene of the melting point 226° to 228° C. are obtained, corresponding to a yield of 80% of the theoretical yield.

Example 3

100 parts of alpha-hexachlorcyclohexane are heated with 175 parts of chlorsulfonic acid in a pressure vessel at 200° C., a pressure of 90 atmospheres thereby being set up. After 5 hours it is allowed to cool and is filtered. The filter residue is washed with water and sucked dry. 85 parts of hexachlorbenzene of the melting point 222° to 226° C. are obtained, corresponding to a yield of 87% of the theoretical yield.

Example 4

100 parts of the hexachlorcyclohexane residual isomer mixture such as is obtained in the production of gamma-hexachlorcyclohexane are heated at 200° C. with 200 parts of sulfuryl chloride. After 5 hours it is allowed to cool and the reaction product is washed with water and methanol. 95 parts of hexachlorbenzene of the melting point 225° to 228° C. are obtained, corresponding to a yield of 97% of the theoretical yield.

Example 5

100 parts of the crude residual isomer mixture such as is obtained in the production of gamma-hexachlorcyclohexane are heated in a closed vessel with 200 parts of sulfuryl chloride and 400 parts of carbon tetrachloride for 4 hours at 160° C. After cooling, the reaction product is freed from solvent, washed with water and dried. 95 parts of hexachlorbenzene of the melting point 227° to 228° C. are obtained.

Example 6

100 parts of the crude residual isomer mixture such as is obtained in the production of gamma-hexachlorcyclohexane are heated in a closed vessel with 200 parts of chlorsulfonic acid and 200 parts of carbon tetrachloride for 5 hours at 170° C. After cooling, the product is filtered free from solvent and washed with methanol. After drying, the hexachlorbenzene has a melting point of 226° to 228° C. The yield is almost quantitative.

Example 7

100 parts of alpha-hexachlorcyclohexane are heated in a closed vessel with 200 parts of sulfuryl chloride, 200 parts of chloroform and 5 parts of aluminum chloride for 5 hours at 140° C. After cooling, the solvent is filtered off and the reaction product washed with water. After drying, 96 parts of hexachlorbenzene of the melting point 227° to 228° C. are obtained.

Example 8

100 parts of the residual isomers obtained in the production of gamma-hexachlorcyclohexane are heated in a closed vessel for 5 hours with 200 parts of sulfuryl chloride and 5 parts of aluminum chloride at 150° C. The reaction product is washed with water and then dried. 95 parts of hexachlorbenzene of the melting point 220° to 224° C. are obtained.

Example 9

100 parts of alpha-hexachlorcyclohexane are heated under reflux with 400 parts of 26% oleum for 90 hours.

After cooling, the reaction product is filtered off and washed with water. 30 parts of hexachlorbenzene of the melting point 220° to 224° C. are obtained.

We claim:

1. A process for the production of hexachlorobenzene which comprises treating hexachlorocyclohexane with a substantial amount of at least one substance selected from the group consisting of chlorides and the anhydride of sulfuric acid at a temperature of at least 100° C. and at a pressure ranging between 1 and 250 atmospheres.

2. A process as claimed in claim 1 wherein the hexachlorocyclohexane is treated with from 120 to 400 parts by weight of at least one substance selected from the group consisting of the chlorides and the anhydride of sulfuric acid to each 100 parts by weight of the initial hexachlorocyclohexane.

3. A process as claimed in claim 1 wherein the treatment of the hexachlorocyclohexane is carried out at temperatures of 130° to 200° C.

4. A process as claimed in claim 1 wherein the treatment occurs in the presence of a catalytic substance selected from the group consisting of a halide of iron, aluminum, phosphorous and sulfur.

5. A process as claimed in claim 1 wherein the treatment occurs in the presence of a halogen hydrocarbon solvent for the hexachlorocyclohexane.

6. A process for the production of hexachlorobenzene which comprises treating hexachlorocyclohexane with the anhydride of sulfuric acid in the form of oleum at a temperature of at least 100° C. and at a pressure ranging between 1 and 250 atmospheres.

7. A process for the production of hexachlorobenzene which comprises treating hexachlorocyclohexane with sulfuryl chloride at a temperature of at least 100° C. and at a pressure ranging between 1 and 250 atmospheres.

8. A process for the production of hexachlorobenzene which comprises treating hexachlorocyclohexane with chlorosulfonic acid at a temperature of at least 100° C. and at a pressure ranging between 1 and 250 atmospheres.

9. A process as claimed in claim 8 wherein the hexachlorocyclohexane is treated with 120 to 400 parts by weight of chlorosulfonic acid to each 100 parts by weight of the initial hexachlorocyclohexane.

10. A process as claimed in claim 8 wherein the treatment occurs in the presence of a catalytic substance selected from the group consisting of a halide of iron, aluminium, phosphorous, and sulphur.

11. A process as claimed in claim 8 wherein the treatment of the hexachlorocyclohexane is carried out at temperatures of 130° to 200° C.

12. A process as claimed in claim 8 wherein the treatment occurs in the presence of a halogen hydrocarbon as solvent for the initial hexachlorocyclohexane.

13. A process as claimed in claim 8 wherein the treatment of the hexachlorocyclohexane is carried out in the presence of an aluminum halide as catalyst and of carbontetrachloride as a solvent for the initial hexachlorocyclohexane.

References Cited in the file of this patent
UNITED STATES PATENTS 2,662,924     Humphreys     Dec. 15, 1953